(12) United States Patent
Kamiya et al.

(10) Patent No.: US 11,003,276 B2
(45) Date of Patent: May 11, 2021

(54) ELECTRONIC EQUIPMENT

(71) Applicant: CANON KABUSHIKI KAISHA, Tokyo (JP)

(72) Inventors: Jun Kamiya, Kawasaki (JP); Haruhisa Ueda, Tokyo (JP); Takahiro Akimoto, Kawasaki (JP); Kimihiro Masuyama, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 71 days.

(21) Appl. No.: 16/440,850

(22) Filed: Jun. 13, 2019

(65) Prior Publication Data

US 2020/0004372 A1 Jan. 2, 2020

(30) Foreign Application Priority Data

Jun. 29, 2018 (JP) .............................. JP2018-125509

(51) Int. Cl.
*G06F 3/041* (2006.01)
*H04N 5/232* (2006.01)
*G06F 3/044* (2006.01)
*H04N 5/225* (2006.01)
*G06F 3/0488* (2013.01)

(52) U.S. Cl.
CPC ............ *G06F 3/0416* (2013.01); *G06F 3/044* (2013.01); *G06F 3/04883* (2013.01); *H04N 5/2251* (2013.01); *H04N 5/232933* (2018.08)

(58) Field of Classification Search
CPC .... G06F 3/0416; G06F 3/04883; G06F 3/044; G06F 2203/0339; G06F 3/04886; G06F 3/04847; G06F 3/03547; G06F 3/0484; G06F 3/041; H04N 5/232933; H04N 5/2251; H04N 5/23216; H04N 5/2252; H04N 5/22525
See application file for complete search history.

(56) References Cited

U.S. PATENT DOCUMENTS

2007/0097090 A1* 5/2007 Battles ................ G06F 3/04847
345/173
2016/0309063 A1 10/2016 Choudhary
(Continued)

FOREIGN PATENT DOCUMENTS

CN 104978107 A 10/2015
CN 106104410 A 11/2016
(Continued)

*Primary Examiner* — Andrew Sasinowski
(74) *Attorney, Agent, or Firm* — Canon U.S.A., Inc. I.P. Division

(57) ABSTRACT

Electronic equipment includes a first operating member and a protruding portion. The first operating member includes a detecting unit that detects touch operations and slide operations. The protruding portion is disposed adjacent to an operating face of the first operating member in a direction of the slide operations, and protrudes in a direction orthogonal to the direction of the slide operations as to the operating face of the first operating member. A detecting face of the detecting unit is divided into at least two detecting faces of a first detecting face through an N'th detecting face, in order from a side of the protruding portion in the direction of the slide operations. An area of the first detecting face is wider than an area of the N'th detecting face.

11 Claims, 10 Drawing Sheets

(56) References Cited

U.S. PATENT DOCUMENTS

| | | | |
|---|---|---|---|
| 2016/0309076 A1* | 10/2016 | Steinberg | H04N 5/23216 |
| 2017/0280534 A1* | 9/2017 | Dimberg | H02G 3/14 |
| 2017/0357324 A1* | 12/2017 | Chaudhri | H04N 5/23245 |
| 2018/0121079 A1* | 5/2018 | Li | G06F 3/04883 |
| 2018/0184007 A1* | 6/2018 | Matsushima | H04N 5/232122 |
| 2018/0196990 A1* | 7/2018 | Xu | G06K 9/00087 |
| 2020/0004360 A1* | 1/2020 | Ueda | G06F 3/0362 |
| 2020/0007786 A1* | 1/2020 | Ueda | H04N 5/23216 |

FOREIGN PATENT DOCUMENTS

| | | |
|---|---|---|
| JP | 2013-25503 A | 2/2013 |
| JP | 2014120003 A | 6/2014 |

* cited by examiner

LINE SEGMENT A PASSING THROUGH MIDPOINT OF SHORT SIDE

ELECTRONIC EQUIPMENT

BACKGROUND

Field

The present disclosure relates to electronic equipment having a touch-sensor operating member.

Description of the Related Art

Conventionally, electronic equipment, of which digital cameras are representative, has been provided with operating members for selecting setting items, such as directional pads, dials, and so forth. In recent years, there has been an increase in products that have a touch panel as a display device, and users can select/set items simply by touching displayed setting items. There are also products that have a touch sensor as an operating member, which is anticipated to serve as a user interface for shooting moving images with imaging apparatuses.

Performing settings while shooting moving images using conventional mechanical operating members results as operation sounds being recorded as noise, but operating sounds to be recorded can be reduced by operating members using touch sensors.

There are various types of touch panels and touch sensors, such as resistive film, capacitive, surface acoustic wave, infrared, electromagnetic induction, image recognition, optical sensor, and so forth, each having advantages and disadvantages, and have been implemented while selecting the type in accordance with the usages.

Japanese Patent Laid-Open No. 2013-25503 discloses a unit for preventing erroneous operation of a touch sensor in a state of gripping a grip, in electronic equipment having a touch-sensor operating member. Specifically, a sensitivity adjustment unit is disclosed where sensitivity at a touch detecting portion at a far side is higher than sensitivity at a touch detecting portion at a side near to an edge of the electronic equipment (grip side). Also disclosed is a determining unit where a position where a touch operation has been performed is determined in accordance with an output value of the sensitivity adjustment unit.

However, the conventional technique disclosed in the above publication judges based on distance from the edge. In a case where measures only involve adjustment of sensitivity, there will be cases where erroneous operations cannot be dealt with, since the ease of input to a layout of a touch detecting portion is unchanged. For example, if there is a protruding portion near an operating member, and input to a touch detecting unit is difficult due to layout position, there is difference in ease of input that distance alone cannot account for, so the situation cannot be handled.

Also, in a case where measures only involve adjustment of sensitivity, there conceivably will be cases where a great increase in sensitivity is necessary, leading to reduced noise tolerance, and erroneous input may increase.

Also, in a case where there is another operating member near a touch detecting portion with increased sensitivity, there is a possibility that erroneous input to the touch detecting portion in a case of operating the other operating member.

SUMMARY

It has been found desirable to provide electronic equipment having a touch sensor operating member where erroneous operation can be reduced even in a case where there has been change in ease of input due to positional relation with other members of the electronic equipment.

According to an aspect of the present disclosure, electronic equipment includes a first operating member having a detecting unit configured to detect touch operations and slide operations, and a protruding portion disposed adjacent to an operating face of the first operating member in a direction of the slide operations, and protruding in a direction orthogonal to the direction of the slide operations as to the operating face of the first operating member, wherein a detecting face of the detecting unit is divided into at least two detecting faces of a first detecting face through an N'th detecting face, in order from a side of the protruding portion in the direction of the slide operations, and wherein an area of the first detecting face is wider than an area of the N'th detecting face.

Further features of the present disclosure will become apparent from the following description of exemplary embodiments with reference to the attached drawings.

DESCRIPTION OF THE EMBODIMENTS

Figure 1A:
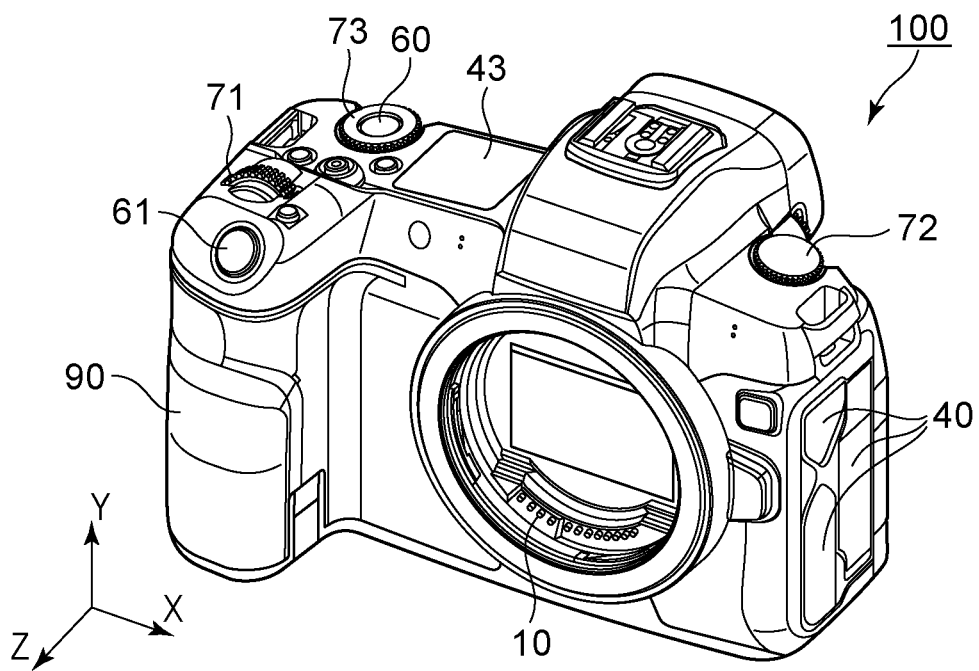
FIGS. 1A and 1B are external views of a digital camera that is an example of an embodiment of the present disclosure.
Figure 1B:
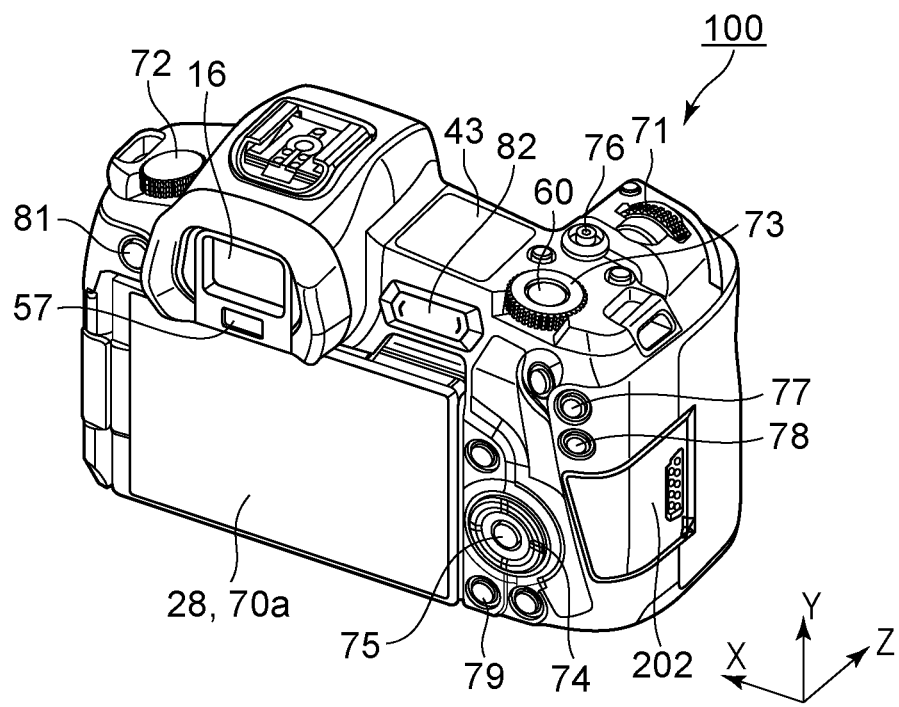

An embodiment of the present disclosure will be described with reference to the drawings. FIGS. 1A and 1B are external views of a digital camera 100 serving as an example of an apparatus to which the present disclosure can be applied. FIG. 1A is a frontal perspective view of the digital camera 100, and FIG. 1B is a rear perspective view of the digital camera 100.

A display unit 28 in FIG. 1B is a display unit provided to the rear face of the camera, to display images and various types of information. A touch panel 70a can detect touch operations made as to the display face (operating face) of the display unit 28.

A non-viewfinder display unit 43 is a display unit provided on the upper face of the camera, and displays various camera setting values such as shutter speed, aperture, and so forth.

A shutter button 61 is an operating unit for giving a shooting instruction. A mode selection switch 60 is an operating unit for switching among various types of modes.

A terminal cover 40 is a cover that protects a connector (omitted from illustration) such as a connection cable connecting external equipment and the digital camera 100.

A main electronic dial 71 is a rotational operating member included in an operating unit 70. Setting values such as shutter speed, aperture, and so forth, can be changed, for example, by rotating this main electronic dial 71.

A power source switch 72 is an operating member that switches the power source for the digital camera 100 on and off.

A sub-electronic dial 73 serving as a second operating member is a rotational operating member included in the operating unit 70, and can be used for moving selection frames, image feeding, and so forth.

A sub-electronic dial 73 is disposed adjacent to the operating face of the touch bar 82 in the direction of slide operations of the touch bar 82 at a position recessed toward the front side (Z direction) as to the operating face of the touch bar 82.

A directional pad 74 is included in the operating unit 70, and can be pressed at upper lower, left, and right portions (four-directional key). Operations can be performed in accordance with the portion of the directional pad 74 that has been pressed.

A set button 75 is a press button that is included in the operating unit 70, and primarily is used for determining selected items.

A moving image button 76 is used to instruct starting and stopping of shooting (recording) moving images.

An automatic exposure (AE) lock button 77 is included in the operating unit 70. The exposure state can be fixed by pressing the AE lock button 77 in a shooting standby state.

A zoom button 78 is an operating button included in the operating unit 70, for turning a zoom mode on and off for live view (LV) display in a shooting mode. Once the zoom mode is turned on, the LV image can be zoomed in and zoomed out by operating the main electronic dial 71. In playback mode, the zoom button 78 serves as an enlarging button to enlarge the playback image to a larger enlargement ratio.

A playback button 79 is an operating button included in the operating unit 70, for switching between the shooting mode and playback mode. When the playback button 79 is pressed in the shooting mode, the mode transitions to the playback mode, and the newest image out of images recorded on a recording medium 200 can be displayed on the display unit 28.

A menu button 81 is included in the operating unit 70. When the menu button 81 is pressed, a menu screen enabling various types of settings is displayed on the display unit 28.

The user can intuitively perform various types of settings using the menu screen displayed on the display unit 28, and the directional pad 74 and set button 75.

A touch bar 82 serving as a first operating member is a linear touch operating member (line touch sensor) extending in the X direction that can accept touch operations. The touch bar 82 is disposed at a position so as to be operable by the thumb of the right hand grasping a grip portion 90. The touch bar 82 can accept tap operations (an operation of touching, and then releasing the finger without moving within a predetermined amount of time), slide operations (an operation of touching, and then moving the touch position while still in contact) to the left or right, and so forth. Note that the touch bar 82 is a separate operating member from the touch panel 70a, and does not have display functions.

A communication terminal 10 is a communication terminal for the digital camera 100 to communicate with the lens side (detachable).

An eyepiece 16 is an eyepiece for a direct viewfinder (a viewfinder that is directly looked through). The user can confirm images by viewing displayed on an electronic viewfinder (EVF) 29 provided inside through the eyepiece 16.

A viewfinder proximity detecting unit 57 is a viewfinder proximity sensor that detects whether the eye of the photographer is in the proximity of the eyepiece 16.

A cover 202 is a cover for a slot accommodating the recording medium 200. The grip portion 90 is a holding portion that has a shape enabling the user to easily grip the digital camera 100 in the right hand. The shutter button 61 and main electronic dial 71 are disposed at positions so as to be operable by the index finger of the right hand in a state where the grip portion 90 is being gripped using the little finger, ring finger, and middle finger of the right hand to hold the digital camera 100. The sub-electronic dial 73 and touch bar 82 are disposed at positions so as to be operable by the thumb of the right hand in the same state.

Figure 2:
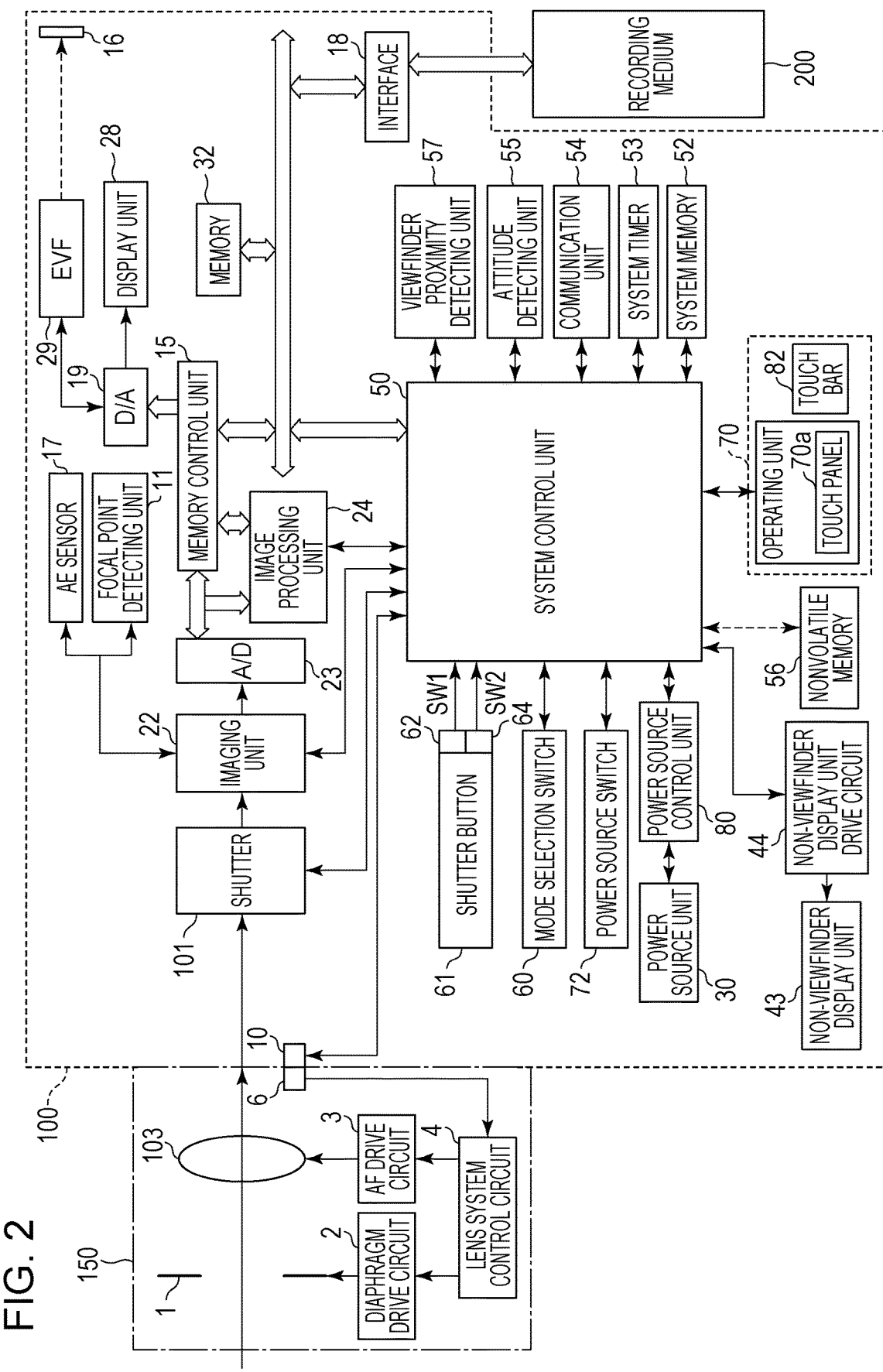
FIG. 2 is a schematic block diagram illustrating a hardware configuration example of the digital camera.

FIG. 2 is a block diagram illustrating a configuration example of the digital camera 100 according to the present embodiment. A lens unit 150 in FIG. 2 is a lens unit where exchangeable shooting lenses are mounted. A lens 103 is usually made up of multiple lenses, but is illustrated as a single lens here for the sake of simplicity.

A communication terminal 6 is a communication terminal for the lens unit 150 to communicate with the digital camera 100 side. The communication terminal 10 is a communication terminal for the digital camera 100 to communicate with the lens unit 150 side.

The lens unit 150 communicates with a system control unit 50 via these communication terminals 6 and 10, and controls a diaphragm 1 via a diaphragm drive circuit 2 by a lens system control circuit 4 provided inside. The lens unit 150 performs focusing by driving the AF drive circuit 3 to change the position of the lens 103.

An AE sensor 17 performs light metering of the luminance of a subject through the lens unit 150.

A focal point detecting unit 11 outputs defocus amount information to the system control unit 50. The system control unit 50 controls the lens unit 150 based on this, thereby performing phase-difference AF. The focal point detecting unit 11 may be a dedicated phase-difference sensor, or may be configured as an imaging plane phase-difference sensor of an imaging unit 22.

A shutter 101 is a focal plane shutter that can freely, or at least without meaningful restriction, control exposure time of the imaging unit 22 under control of the system control unit 50.

The imaging unit 22 is an imaging device configured of a charge-coupled device (CCD) or complementary metal-oxide semiconductor (CMOS) device or the like, that converts optical images into electrical signals. An A/D converter 23 converts analog signals into digital signals. The A/D converter 23 is used for converting analog signals output from the imaging unit 22 into digital signals.

An image processing unit 24 subjects data from the A/D converter 23 or data from a memory control unit 15 to predetermined pixel interpolation, resizing processing such as reduction, and color conversion processing. The image processing unit 24 also performs predetermined computation processing using the taken image data. The system control unit 50 performs exposure control and ranging control based on the computation results obtained by the image processing unit 24. Accordingly, through-the-lens (TTL) AF processing, AE processing, and electronic flash (EF) pre-flashing is performed. The image processing unit 24 further performs predetermined computation processing using the taken image data, and performs TTL automatic white balance (AWB) processing based on the obtained computation results.

Output data from the A/D converter 23 is written to memory 32 via the image processing unit 24 and memory control unit 15, or directly written to the memory 32 via the memory control unit 15. The memory 32 stores image data obtained by the imaging unit 22 and converted into digital data by the A/D converter 23, and image data for display on the display unit 28 and EVF 29. The memory 32 has a sufficient storage capacity for storing a predetermined number of still images or a predetermined amount of time of moving images and audio. The memory 32 also serves as memory (video memory) for image display.

A D/A converter 19 converts data for image display that is stored in the memory 32 into analog signals, and supplies the resultant analog signals to the display unit 28 and EVF 29. Thus, the image data for display that has been written to the memory 32 is displayed at the display unit 28 and EVF 29 via the D/A converter 19. The display unit 28 and EVF 29 perform displays in accordance with analog signals from the D/A converter 19, on display devices such as a liquid crystal display (LCD), organic electroluminescent display (ELD), or the like.

Digital signals that have been once subjected to A/D conversion by the A/D converter 23 and stored in the memory 32 are subjected to analog conversion by the D/A converter 19, and thereafter sequentially transmitted to the display unit 28 or EVF 29 for display. Thus, LV display can be performed. Hereinafter, images displayed in live view will be referred to as LV images.

Various setting values of the camera, such as shutter speed, aperture, and so forth, are displayed on the non-viewfinder display unit 43 via a non-viewfinder display unit drive circuit 44.

Nonvolatile memory 56 is electrically erasable and recordable memory. Electrically erasable programmable read-only memory (EEPROM) or the like, for example, is used. Constants, programs, and so forth for the system control unit 50 to operate, are stored in the nonvolatile memory 56. The term programs as used here refers to programs for executing various types of processing described later in the present embodiment.

The system control unit 50 is a control unit made up of at least one processor or circuit, and controls the entire digital camera 100. The processes of the present embodiment, which will be described later, are realized by executing the programs recorded in the aforementioned nonvolatile memory 56.

Random access memory (RAM), for example, is used for system memory 52, and constants, variables, programs read out from the nonvolatile memory 56, and so forth, for the system control unit 50 to operate, are unfolded.

The system control unit 50 also performs display control by controlling the memory 32, D/A converter 19, display unit 28, and so forth.

A system timer 53 is a clocking unit that measures time used for various types of control, and time of a built-in clock.

The mode selection switch 60, a first shutter switch 62, a second shutter switch 64, and the operating unit 70 are operating units for input of various operation instructions to the system control unit 50.

The mode selection switch 60 switches the operation mode of the system control unit 50 to one of still image shooting mode, moving image shooting mode, playback mode, or the like.

Modes included in the still image shooting mode include automatic shooting mode, automatic scene determination mode, manual mode, aperture prioritized mode (Av mode), shutter speed prioritized mode (TV mode), and programmable AE mode (P mode).

There are also various types of scene modes, custom modes, and so forth, that are shooting settings for different shooting scenes. The user can directly switch to one of these modes using the mode selection switch 60. Alternatively, an arrangement may be made where the mode selection switch 60 is used to temporarily switch to a list screen of shooting modes, and thereafter one of multiple modes displayed is selected, and other operating members are used to switch the mode. In the same way, the moving image shooting mode may include multiple modes.

The first shutter switch 62 goes on partway through operation of the shutter button 61 provided to the digital camera 100, at the so-called half-pressed state (shooting preparation instruction), and generates a first shutter switch signal SW1. The first shutter switch signal SW1 starts shooting preparation operations such as AF processing, AE processing, AWB processing, EF pre-flashing processing, and so forth.

The second shutter switch 64 goes on with operation of the shutter button 61 being completed, at the so-called full-pressed state (shooting instruction), and generates a second shutter switch signal SW2. Upon the second shutter switch signal SW2 being generated, the system control unit 50 starts the series of shooting processing operations, from reading signals from the imaging unit 22 up to writing the image that has been taken to the recording medium 200 as an image file.

The operating unit 70 is various types of operating members serving as input units for accepting operations from the user. The operating unit 70 includes at least the following operating units. Illustrated examples of the operating units are the shutter button 61, main electronic dial 71, power source switch 72, sub-electronic dial 73, and directional pad 74. Further included are set button 75, moving image button 76, AF lock button 77, zoom button 78, playback button 79, menu button 81, and touch bar 82.

A power source control unit 80 is made up of a battery detecting circuit, a DC-DC converter, switching circuits for switching blocks to supply voltage to, and so forth, and performs detection of whether or not a battery is mounted, the type of the battery, and remaining charge in the battery. The power source control unit 80 also controls the DC-DC converter based on the detection results thereof and instructions from the system control unit 50, to supply necessary voltage to various parts including the recording medium 200 for necessary amount of time.

A power source unit 30 is made up of a primary battery such as an alkaline battery, lithium battery, or the like, a secondary battery such as a nickel-cadmium battery, nickel-metal hydride battery, lithium-ion battery, or the like, an AC adapter, and so forth.

A recording medium interface 18 is an interface for the recording medium 200 such as a memory card, hard disk, or the like. The recording medium 200 is a recording medium such as a memory card or the like, for recording images that have been shot, and is made up of semiconductor memory, a magnetic disk, or the like.

A communication unit 54 is externally connected wirelessly or by cable, and exchanges video signals and audio signals. The communication unit 54 is also configured to connect with a wireless local area network (LAN), the Internet, or the like. The communication unit 54 is further configured to communicate with external equipment via a wireless technology standard such as Bluetooth (a registered trademark) or a wireless personal area network technology such as Bluetooth Low Energy as well. The communication unit 54 is configured to transmit images (including LV images) taken by the imaging unit 22, and images recorded in the recording medium 200, and further can receive images and other various types of information from external equipment.

An attitude detecting unit 55 detects the attitude of the digital camera 100 as to the gravitational direction. Whether an image taken by the imaging unit 22 is an image taken with the digital camera 100 held landscape or an image taken with the digital camera 100 portrait, can be distinguished based on the attitude detected by the attitude detecting unit 55. The system control unit 50 is configured to add orientation information according to the attitude detected by the attitude detecting unit 55 to image files of images taken by the imaging unit 22, and rotate and record images. Examples of the attitude detecting unit 55 include acceleration sensors, gyro sensors, and so forth. Movement of the digital camera 100 (panning, tilting, raising, whether still or not, etc.) can also be detected using the acceleration sensors, gyro sensors, and so forth, serving as the attitude detecting unit 55.

Viewfinder Proximity Detecting Unit 57

The viewfinder proximity detecting unit 57 is a viewfinder proximity detecting sensor that detects (proximity detection) approaching (proximal) of an eye (object) to the eyepiece 16 of the viewfinder and retraction (distanced) thereof (proximity detection). The system control unit 50 switches the display (display state)/non-display (non-display state) of the display unit 28 and EVF 29 in accordance with the state detected by the viewfinder proximity detecting unit 57. More specifically, in at least a shooting standby state where switching of the display location is being automatically switched, the display unit 28 is set as the display location and display is turned on, and the EVF 29 is turned off while the eye is not in proximity with the eyepiece 16. On the other hand, display at the display unit 28 is turned off and the EVF 29 is set as the display location and display is turned on while the eye is in proximity with the eyepiece 16.

An infrared proximity sensor, for example, can be used for the viewfinder proximity detecting unit 57, to detect some sort of object approaching the eyepiece 16 of the viewfinder in which the EVF 29 is built in. In a case where an object is approaching, infrared rays cast by an emitting unit (omitted from illustration) of the viewfinder proximity detecting unit 57 are reflected and received at a photoreceptor (omitted from illustration) of the infrared proximity sensor. How far the object is from the eyepiece 16 (viewfinder proximity distance) can also be distinguished by the amount of infrared rays received. Thus, the viewfinder proximity detecting unit 57 performs proximity detection to detect the proximity distance of an object to the eyepiece 16.

In a case where an object is detected approaching the eyepiece 16 within a predetermined distance therefrom, from a viewfinder distanced state (a distanced state), proximity of an eye is detected. In a case where an object that had been in proximity has moved away a predetermined distance, from a viewfinder proximity state (a proximity state), distancing of the eye is detected. The threshold value at which proximity of an eye is detected, and the threshold value at which distancing of an eye is detected, may be different, with a hysteresis provided, for example. Once proximity of an eye is detected, the state is a viewfinder proximity state until distancing of the eye is detected. Once distancing of the eye is detected, the state is a viewfinder distanced state until proximity of the eye is detected. Note that an infrared proximity sensor is but one example, and other sensors may be employed for the viewfinder proximity detecting unit 57 as long as proximity of an eye or an object, that can be deemed to be proximity of an eye, can be detected.

Operation Method of Touch Panel 70a

The touch panel 70a can be integrally configured with the display unit 28. For example, the touch panel 70a is configured having a light transmittance so as not to impede display of the display unit 28, and is attached to the top layer of the display face of the display unit 28. The input coordinates on the touch panel 70a are correlated with the display coordinates on the display screen of the display unit 28. Accordingly, a graphical user interface (GUI), which gives the impression of the user being able to directly operate the screen displayed on the display unit 28, can be provided.

The system control unit 50 can detect the following operations and states regarding the touch panel 70a.

A finger or pen that has not been in touch with the touch panel 70a has newly touched the touch panel 70a, i.e., a touch has been started (hereinafter referred to as touch-down).

A finger or pen is in a state touching the touch panel 70a (hereinafter referred to as touch-on).

A finger or pen is moving while being in a state touching the touch panel 70a (hereinafter referred to as touch-move).

A finger or pen that had been in a state touching the touch panel 70a has moved away, i.e., end of touch (hereinafter referred to as touch-up).

A state where nothing is touching the touch panel 70a (hereinafter referred to as touch-off).

When touch-down is detected, touch-on is also detected at the same time. Unless touch-up is detected after touch-down, touch-on normally continues to be detected. Touch-move is detected in a state where touch-on is detected. Even if touch-on is detected, touch-move is not detected unless the touch position moves. Touch-off is established after touch-up of all fingers or pens in touch has been detected.

These operations and states, and positional coordinates of a finger or pen touching the touch panel 70a, are notified to the system control unit 50 via an internal bus. The system control unit 50 determines what sort of operations (touch operations) have been made on the touch panel 70a, based on the information notified thereto.

The direction of movement of the finger or pen moving over the touch panel 70a during a touch-move can be determined for each of the vertical component and horizontal component on the touch panel 70a, based on change in the positional coordinates. In a case where a touch-move of a predetermined distance or longer has been detected, a slide operation is determined to have been performed.

An operation of quickly moving a finger over the touch panel 70a for a certain distance or so while in touch and moving away is called flicking. The term flicking for this operation comes from the way in which the surface of the touch panel 70a is flicked quickly by the finger. In a case where a touch-move has been detected for a predetermined distance or more, at a predetermined speed or more, ending with a touch-up being detected, flicking can be determined to have been performed (flicking can be determined to have been performed after a slide operation).

Further, performing a touch operation of touching multiple places (e.g., two points) at the same time, and bringing the touch positions closer to each other is referred to as pinch-in, while an operation of distancing the touch positions from each other is referred to as pinch-out. Pinch-out and pinch-in are collectively referred to as pinch operations (or simply pinching).

There are various types of touch panels, such as resistive film, capacitive, surface acoustic wave, infrared, electromagnetic induction, image recognition, optical sensor, and so forth, any of which can be used for the touch panel 70a. Some types detect touch by contact as to the touch panel 70a, while other types detect touch by proximity of a finger or pen to the touch panel 70a, and either may be used.

Description of Schematic Diagrams of User Operations

As described above, various functions can be operated by the touch bar 82, but there is a need to perform operations while viewing the display screen provided to the digital camera 100 in order to perform operations while comprehending the various functions set to the touch bar 82.

Figure 10A:
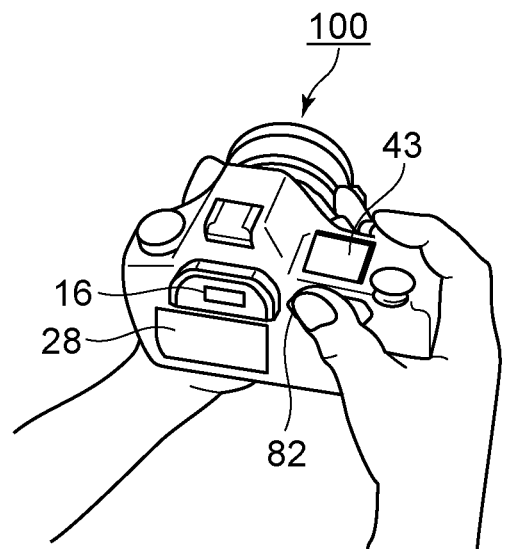
FIGS. 10A and 10B are schematic diagrams of a user operating the touch bar.
Figure 10B:
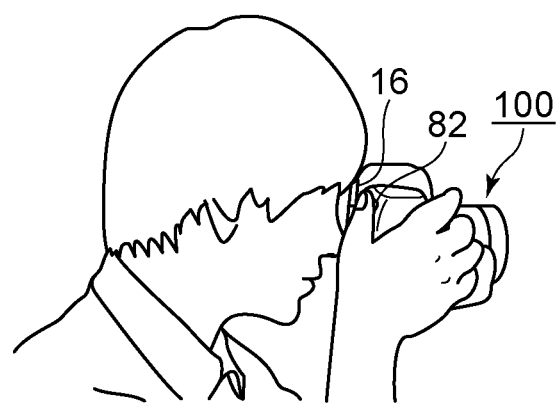

FIG. 10A is a schematic diagram illustrating a user operating the touch bar 82 while looking at the display unit 28 provided on the rear face of the camera and the non-viewfinder display unit 43 provided on the upper face of the camera. FIG. 10B is a schematic diagram illustrating a user operating the touch bar 82 while looking at the EVF 29 within the direct viewfinder. In a case of a camera having multiple display units as illustrated in FIGS. 10A and 10B, the user performs shooting and setting of shooting functions in various styles, so the touch bar 82 needs to be situated at a position that is easy to operate while looking at any of the display units.

Operation Method of Touch Bar 82

The system control unit 50 calculates positional coordinates of a thumb touching the touch bar 82, based on output information from the touch bar 82. The system control unit 50 can further detect the following operations and states regarding the touch bar 82.

- A thumb that has not been in touch with the touch bar 82 has newly touched the touch bar 82, i.e., a touch has been started (hereinafter referred to as touch-down).
- A thumb is in a state touching the touch bar 82 (hereinafter referred to as touch-on).
- A thumb is moving while being in a state touching the touch bar 82 (hereinafter referred to as touch-move).
- A thumb that had been in a state touching the touch bar 82 has moved away, i.e., end of touch (hereinafter referred to as touch-up).
- A state where nothing is touching the touch bar 82 (hereinafter referred to as touch-off).

When touch-down is detected, touch-on is also detected at the same time. Unless touch-up is detected after touch-down, touch-on normally continues to be detected. Touch-move is detected in a state where touch-on is detected. Even if touch-on is detected, touch-move is not detected unless the touch position moves. Touch-off is established after touch-up of the thumb in touch has been detected.

The system control unit 50 determines what sort of operations (touch operations) have been made on the touch bar 82, based on these operations and states, and positional coordinates. Horizontal-direction (right-left direction) movement on the touch bar 82 is detected for a touch-move. In a case where movement of a predetermined distance or longer is detected, a slide operation is determined to have been performed. In a case where the touch bar 82 is touched by a thumb, and the touch is released within a predetermined amount of time without performing a slide operation, a tap operation is determined to have been performed.

The touch bar 82 according to the present embodiment is a capacitive touch sensor. However, the touch bar 82 may be a different type of touch sensor, such as resistive film, surface acoustic wave, infrared, electromagnetic induction, image recognition, optical sensor, and so forth.

Figure 7A:
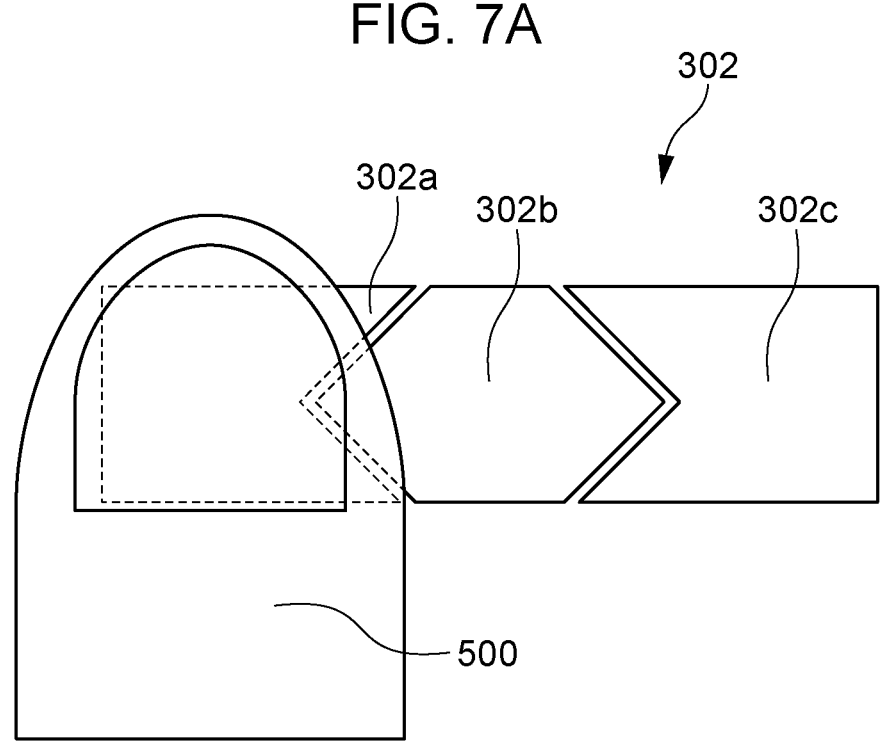
FIGS. 7A and 7B are conceptual diagrams of tap operations.
Figure 7B:
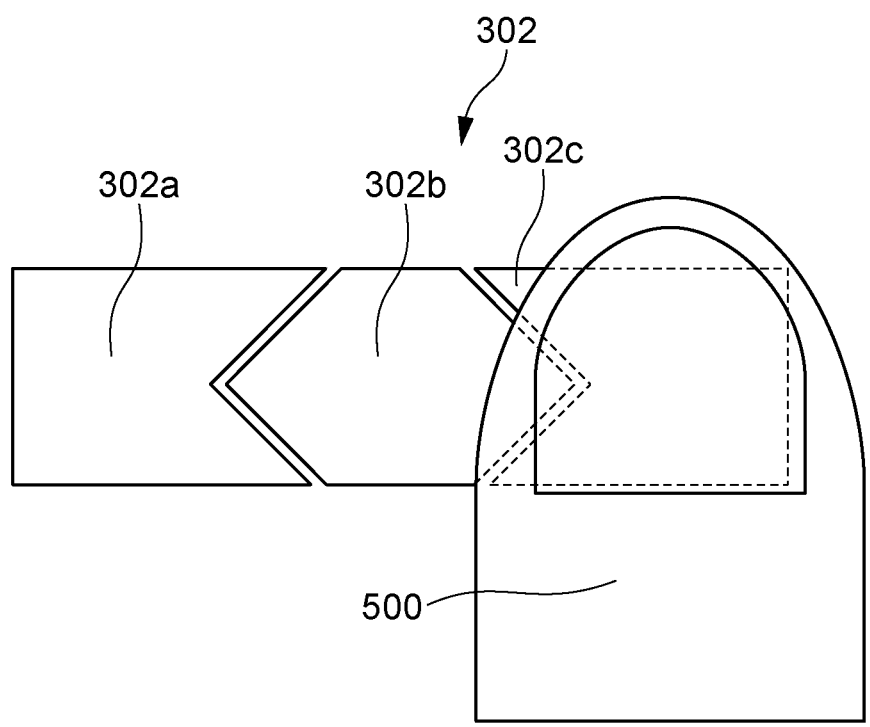
Figure 8A:
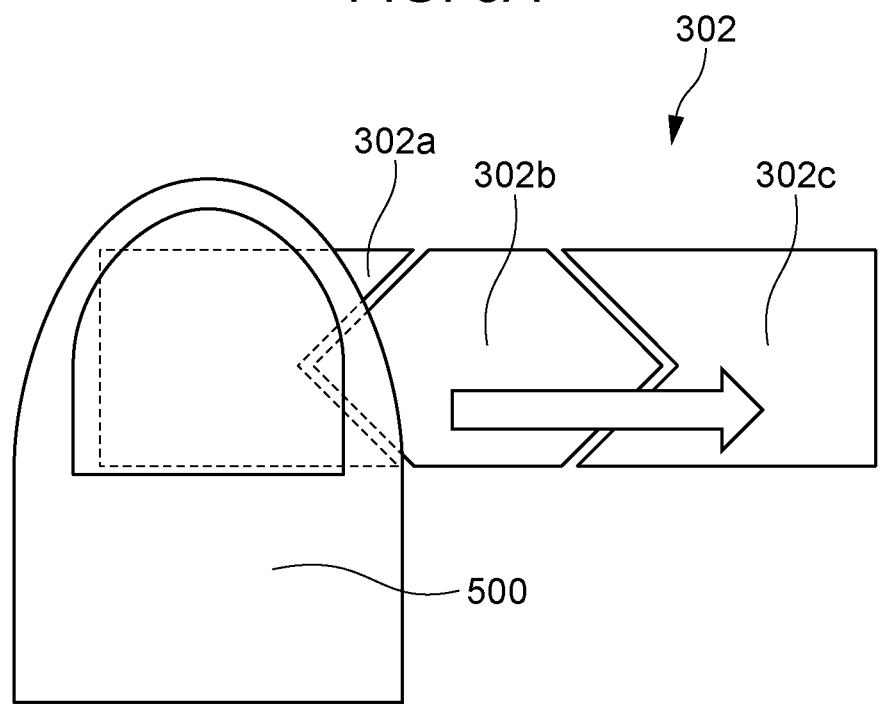
FIGS. 8A and 8B are conceptual diagrams of slide operations.
Figure 8B:
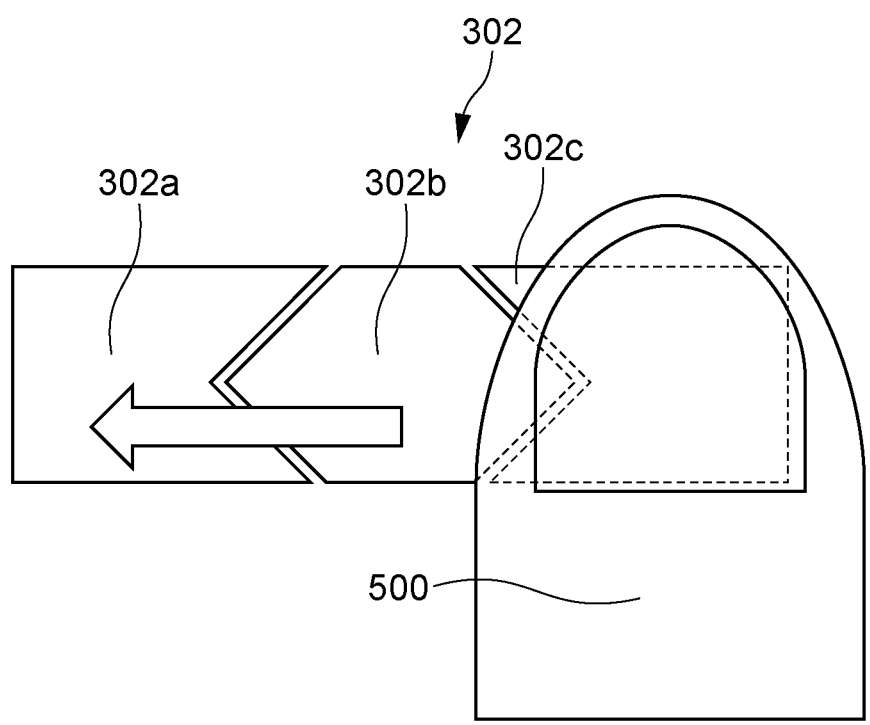
Figure 9:
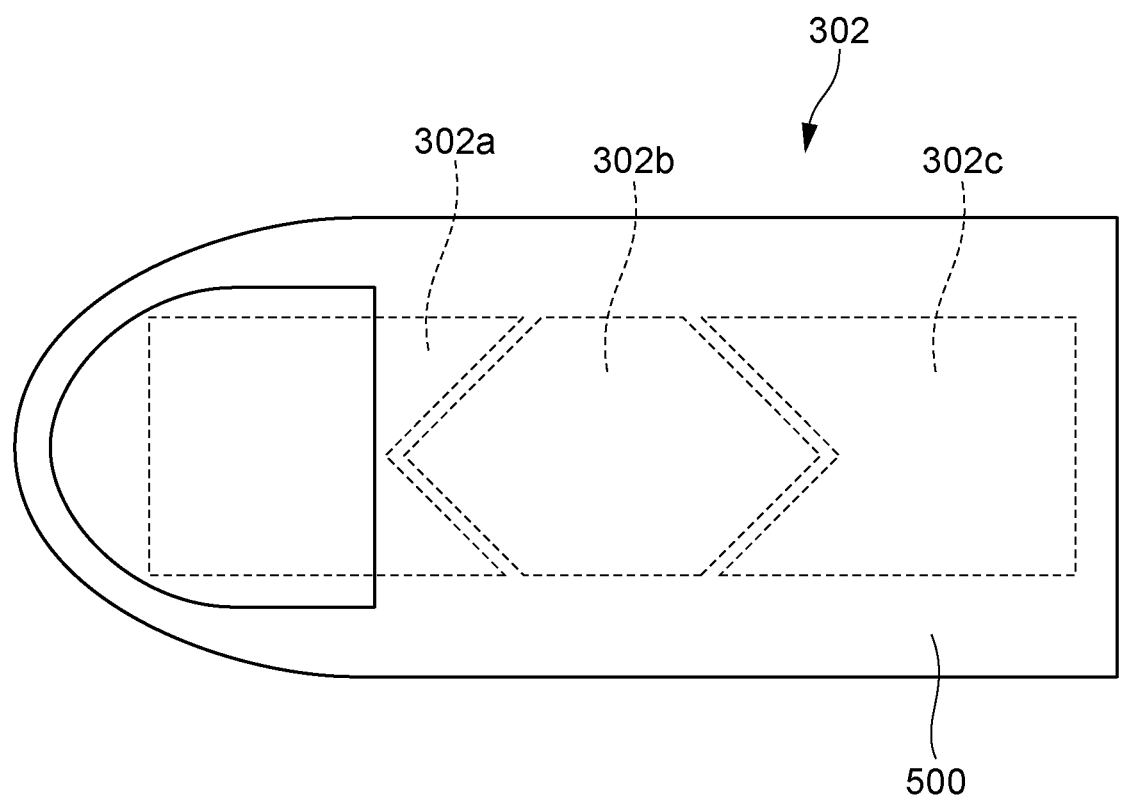
FIG. 9 is a conceptual diagram of full-area pressing operations.

Operations using the touch bar 82 will be described below in detail with reference to FIGS. 7A through 9. FIGS. 7A and 7B are conceptual diagrams of tap operations, FIGS. 8A and 8B are conceptual diagrams of slide operations, and FIG. 9 is a conceptual diagram of full-area pressing operations. The outlines of the touch bar 82 and a flexible board 301 are omitted throughout FIGS. 7A through 9. Only a touch sensor electrode 302, and an operating thumb 500 by which the user performs operations, are illustrated.

The touch sensor electrode 302 is made up of three electrodes, which are a first touch sensor electrode 302a, a second touch sensor electrode 302b, and a third touch sensor electrode 302c, in order from the side closer to the eyepiece 16 that is a protruding portion. The touch sensor electrode 302 detects change in capacitance by the operating thumb 500 that performs user operations, whereby tap operations, slide operations, and full-area pressing operations can be performed.

In reality, touch detection is performed by the operating thumb 500 of the user coming into contact with the touch bar 82 disposed at the near side of the touch sensor electrode 302. However, description will be made below that touch detection is performed by the operating thumb 500 coming into contact with the touch sensor electrode 302, in order to simplify description regarding tap operations, slide operations, and full-area pressing operations.

FIGS. 7A and 7B are conceptual diagrams of tap operations, where FIG. 7A is a conceptual diagram of a left tap operation, and FIG. 7B is a conceptual diagram of a right tap operation. The operating thumb 500 of the user comes into contact with the first touch sensor electrode 302a, and then moves away, as illustrated in FIG. 7A, which is detected as a left tap operation. In the same way, the operating thumb 500 of the user comes into contact with the third touch sensor electrode 302c, and then moves away, as illustrated in FIG. 7B, which is detected as a right tap operation.

Although two tap operations of left tap operation and right tap operation have been described in the present example, this is not restrictive. A middle tap operation may be provided using the second touch sensor electrode 302b.

FIGS. 8A and 8B are conceptual diagrams of slide operations, where FIG. 8A is a conceptual diagram of a right slide operation, and FIG. 8B is a conceptual diagram of a left slide operation. The operating thumb 500 comes into contact with the first touch sensor electrode 302a of the touch sensor electrode 302, and then moves toward the direction of the third touch sensor electrode 302c, as illustrated in FIG. 8A, which is detected as a right slide operation. In the same way, the operating thumb 500 comes into contact with the third touch sensor electrode 302c, and then moves toward the direction of the first touch sensor electrode 302a, as illustrated in FIG. 8B, which is detected as a left slide operation.

The start position of slide operations is not restricted to the first touch sensor electrode 302a or third touch sensor electrode 302c, and a slide operation may start from contact with the second touch sensor electrode 302b. That is to say, movement where the operating thumb 500 comes into contact with the second touch sensor electrode 302b, and then moves toward the direction of the third touch sensor electrode 302c, may be detected as a right slide operation. Similarly, movement where the operating thumb 500 comes into contact with the second touch sensor electrode 302b, and then moves toward the direction of the first touch sensor electrode 302a, may be detected as a left slide operation.

FIG. 9 is a conceptual diagram of a full-area pressing operation. All of the first touch sensor electrode 302a, second touch sensor electrode 302b, and third touch sensor electrode 302c of the touch sensor electrode 302 pressed by the operating thumb 500 at once, which is detected as a full-area pressing operation. While the operating thumb 500 is pressed generally perpendicularly as to the touch sensor electrode 302 in tap operations and slide operations, the operating thumb 500 is pressed generally parallel as to the touch sensor electrode 302 in full-area pressing operations. That is to say, this is an operation that is relatively difficult to perform in comparison with tap operations and slide operations, but on the other hand, this is an operation that the user cannot perform without intent to do so.

The user does not necessarily have to touch all of the touch sensor electrode 302 as illustrated in FIG. 9 to perform full-area pressing operations. A full-area pressing operation may be recognized even if part of the first touch sensor electrode 302a and part of the third touch sensor electrode 302c is not being touched.

EXAMPLES

Figure 3A:
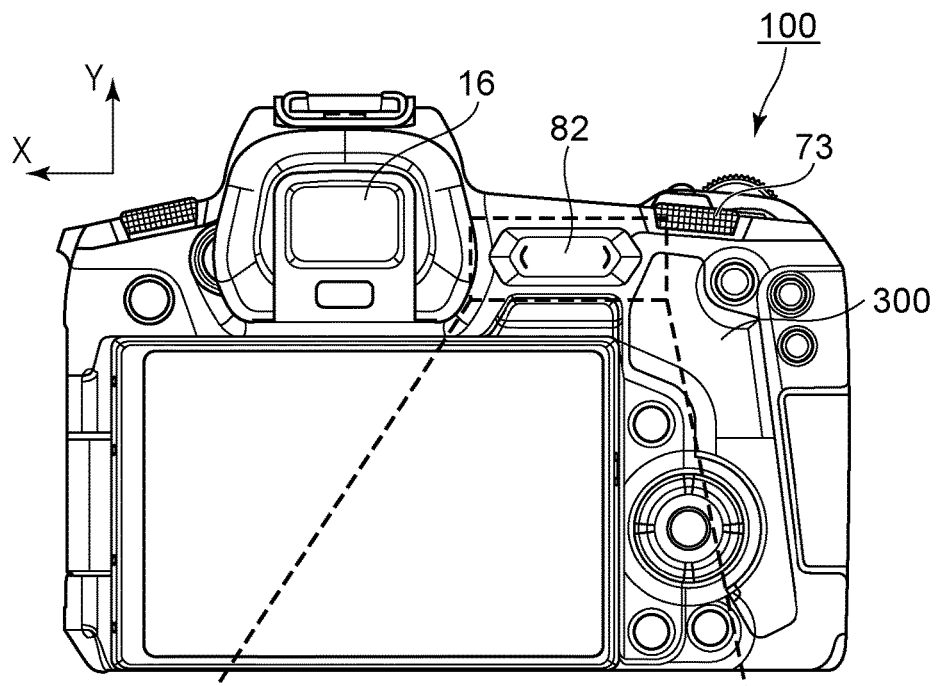
FIGS. 3A and 3B are diagrams illustrating a layout position and internal configuration of a touch bar.
Figure 3B:
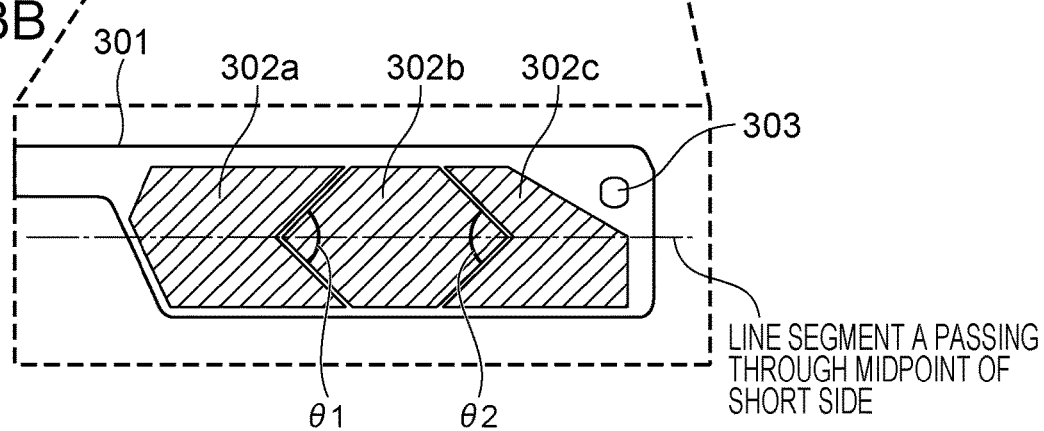

An example of the present disclosure will be described with reference to FIGS. 3A through 6C. FIGS. 3A and 3B are diagrams illustrating the layout position and internal configuration of the touch bar 82 in the digital camera 100 serving as the imaging apparatus (electronic equipment) according to the present example.

The imaging apparatus has the touch bar 82 that is provided with the touch sensor electrode 302 for touch operations, and the eyepiece 16 disposed adjacent to the operating face of the touch bar 82 in the direction of slide operations, protruding toward the rear side as to the operating face of the touch bar 82.

The sub-electronic dial (second operating member) 73 is provided disposed adjacent to the operating face of the touch bar (first operating member) 82 in the direction of slide operations. The sub-electronic dial 73 is a rotational operating member that is operated by moving the thumb in a uniaxial direction, as viewed from the rear side of the electronic equipment.

The touch detecting face 302 is disposed on the inner side of the operating face (keytop) of the touch bar (first operating member) 82.

The touch bar (first operating member) 82 and touch panel (display unit) 70a are arrayed in a direction orthogonal to the direction of slide operations, as viewed from the rear side of the electronic equipment.

An outer cover disposed on the outer edge of the touch bar (first operating member) 82 is made of an electroconductive material, while the touch bar 82 itself is of a non-electroconductive material.

The touch detecting face 302 is distanced from the outer cover, so that the touch detecting face 302 and outer cover are electrically insulated.

A touch detecting face of the touch sensor electrode 302 is divided into at least two touch detecting faces of a first touch detecting face 302a through an N'th touch detecting face 302n in order from the protruding portion side (eyepiece 16 side) in the direction of slide operations. N is a positive integer. N=3 in FIGS. 3A and 3B, so the touch sensor electrode 302 is divided into three.

The surface area of the first touch detecting face 302a is wider than the surface area of the N'th touch detecting face 302n in the present example. A region generated by narrowing the N'th touch detecting face 302n is covered by an operating face 401 configured to receive slide operations and tap operations.

The N'th touch detecting face 302n is the closest to the grip portion 90 out of the N touch detecting faces in the direction of slide operations. The value of N indicates the number into which the touch sensor electrodes has been divided, and it is sufficient for N to be 2 or greater.

The sub-electronic dial 73 according to the present embodiment is closest to the N'th touch detecting face 302n out of the N touch detecting faces in the direction of slide operations.

In a case where a line segment is defined extending in the direction of slide operations, and passing through midpoints of the short sides of the touch detecting face of the touch sensor electrode 302, a region of the N'th touch detecting face 302n that is closer to the sub-electronic dial 73 with the line segment as a reference is a first region. The region of the N'th touch detecting face 302n on the side farther from the sub-electronic dial 73 is a second region. In this case, the surface area of the first region is narrower than the surface area of the second region.

A line segment is defined extending in the direction of slide operations, and passing through midpoints of the short sides of the touch detecting face 302, as viewed from the rear side of the electronic equipment. In this case, the N'th touch detecting face 302n has a shape where the side on the sub-electronic dial (second operating member) 73 is narrower than the side opposite from the sub-electronic dial 73, with the line segment as a reference.

A positioning hole 303 is provided to the flexible board 301 to which the touch sensor electrode 302 is mounted, at a region generated by narrowing the N'th touch detecting face 302n.

N=3 in FIGS. 3A and 3B. The detecting face is a touch sensor electrode divided into three.

A line segment is defined extending in the direction of slide operations, and passing through midpoints of the short sides of the touch detecting face of the touch sensor electrode 302. In this case, a region of the N'th touch detecting face 302n that is closer to the sub-electronic dial (second operating member) 73 with the line segment as a reference is a first region. The region of the N'th touch detecting face 302n on the side farther from the sub-electronic dial 73 is a second region. In this case, the surface area of the first region is narrower than the surface area of the second region.

A line segment is defined extending in the direction of slide operations, and passing through midpoints of the short sides of the touch detecting face of the touch sensor electrode 302. In this case, a region of the N'th touch detecting face 302n that is closer to the sub-electronic dial 73 with the line segment as a reference is a first region. The region of the N'th touch detecting face 302n on the side closer to the display unit 28 is a second region. In this case, the surface area of the first region is narrower than the surface area of the second region.

The touch bar 82 is disposed adjacent to the eyepiece 16 on the rear face of the digital camera 100, as illustrated in FIG. 3A. The touch bar 82 is also disposed adjacent to the sub-electronic dial 73, and to a thumb standby position 300, which is the position of the thumb in a case of gripping the grip portion 90 with the right hand to hold the camera.

The thumb standby position 300 generally exists at an upper part of a position where the grip portion 90 is projected on the rear side as illustrated in FIG. 3A, and often the position is indicated by application of rubber or the like, which also increases grip. By situating the touch bar 82 next to the thumb standby position 300, the layout is such that it is easy to perform tap operations, slide operations to the left and right (X-axis direction) or the like, using the thumb of the right hand in a state of gripping the grip portion 90, as described earlier.

The touch bar 82 can assign functions in accordance with operations. For example, settable exposure-related setting values can be assigned using the main electronic dial 71 and sub-electronic dial 73 that are operating members.

For example, in a case of a tap operation being performed at a position to the left half of the touch bar 82, functions of setting the shooting ISO sensitivity of the digital camera 100 to sensitivity ⅓ step lower are assigned. In a case where a tap operation is performed at positional coordinates to the right half side, functions of setting the shooting ISO sensitivity to sensitivity ⅓ step higher are assigned. In a case where slide operations are performed, functions of setting the shooting ISO sensitivity of the digital camera 100 to sensitivity ⅓ step higher or lower are assigned for each step of sliding.

These assignable functions are customizable by the user, and for example, in a case where a tap operation is made at a left half position, functions for automatically setting shooting ISO sensitivity of the digital camera 100 are assigned. Changes can be made such as, in a case where a tap operation is made at a right half positional coordinate, functions for setting the shooting ISO sensitivity to the highest ISO sensitivity are assigned.

Now, unless determination of operations are not made accurately with regard to the intent of operations by the user, erroneous operations will occur. However, consistency of operations as to intent may suffer depending on the distance of the touch bar 82 from the thumb standby position 300 and the positional relation as to other members on the equipment. For example, ease of touching changes depending on the distance from the thumb standby position 300. Specifically, the touch bar 82 is easy to touch near the thumb standby position 300, but the closer from that position toward the eyepiece 16, the more the thumb needs to be stretched, and the more difficult touching becomes.

The touch bar 82 can also assign, besides exposure-related setting values, settings such as white balance settings, AF mode, drive mode, and playback feed.

When in the moving image mode, microphone recoding level adjustment, or moving image playback fast-forward or reverse functions can be assigned.

The eyepiece 16 is a direct viewfinder where images displayed on the EVF 29 provided inside are confirmed by viewing, as described above. However, the eyepiece 16 has a protruding shape projecting to the outer cover side (rear side) so that a suitable eyepoint can be secured, and that the nose does not readily come into contact with the display unit 28 when in the viewfinder proximity state.

When viewing the electronic equipment from the rear side, the touch bar 82 overlaps the operating face of the display unit 28 in the direction of slide operations, and does not overlap the operating face of the display unit 28 in a direction orthogonal to the direction of slide operations. In a case of viewing the electronic equipment from the rear side, the touch bar (first operating member) 82 is disposed at a position recessed toward the front side as to the operating face of the display unit 28.

In the present example, the eyepiece 16 is protruding by 15 mm or more in the Z direction as compared to the touch face of the touch bar 82. Accordingly, touch input to the edge of the touch bar 82 adjacent to the eyepiece 16 is difficult. Particularly with regard to slide operations, in a case where input cannot be performed from edge to edge, the number of steps of setting values is reduced, so the effects thereof are pronounced. Accordingly, while a protruding shape of 15 mm or more, which is relatively great, has been exemplified in the present example, effects on operability are manifested even with a protruding shape of 1 mm or more.

Also, the sub-electronic dial 73 is a rotational operating member as described above. Input of multiple stages can be performed by rotating in the horizontal direction (X-axis direction) using the thumb of the right hand. However, there is the possibility of unintentionally touching the adjacent touch bar 82 at the time of this operation.

Description of Sub-Electronic Dial 73

Figure 4A:
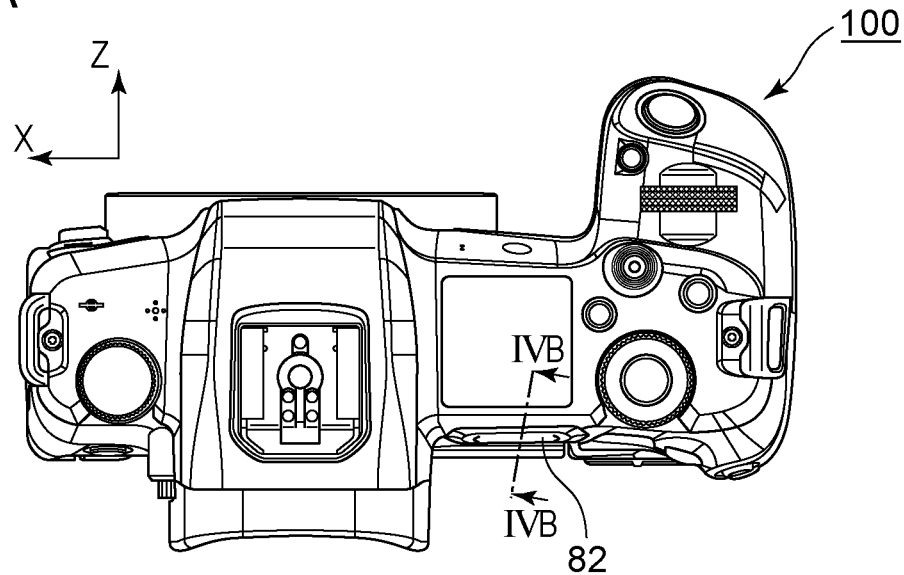
FIGS. 4A through 4C are diagrams illustrating an attachment method of a flexible board.

The sub-electronic dial 73 is provided at a position recessed to the front side of the imaging apparatus (Z direction) in comparison with the touch face 401 of the touch bar 82, as illustrated in FIGS. 1B and 4A. However, the step in the Z direction between the touch face 401 of the touch bar 82 and the contact face of turning the sub-electronic dial 73 with the thumb of the right hand is small. Accordingly, there is the possibility of unintentionally touching the adjacent touch bar 82 when operating the sub-electronic dial 73.

In the present example in FIGS. 1B and 4A, the sub-electronic dial 73 is provided at a position recessed to the front side of the imaging apparatus (Z direction) in comparison with the touch face 401 of the touch bar 82. However, an arrangement where the sub-electronic dial 73 is provided at a position protruding to the rear side of the imaging apparatus (Z direction) in comparison with the touch face 401 of the touch bar 82 is also included in the present disclosure.

The step between the touch face 401 of the touch bar 82 and the contact face of turning the sub-electronic dial 73 with the thumb of the right hand, protruding toward the rear side (Z direction) is small. Accordingly, there is the possibility of unintentionally touching the adjacent touch bar 82 with the thumb of the right hand when operating the sub-electronic dial 73.

The sub-electronic dial 73 is a rotational operating member that uniaxially rotates in the X direction with the Y direction as the axis of rotation.

When viewing the imaging apparatus (electronic equipment) from the rear side, the touch bar 82 serving as a first operating member overlaps the operating face of the touch panel 70a serving as a display unit, in the direction of slide operations (X direction). The touch bar 82 serving as a first operating member does not overlap the operating face of the touch panel 70a serving as a display unit, in a direction orthogonal to the direction of slide operations (Y direction).

When viewing the imaging apparatus (electronic equipment) from the rear side, the touch bar 82 is situated at a position recessed to the front side (Z direction) as to the operating face of the touch panel 70a. However, the step in the Z direction between the operating face (touch face) of the touch bar 82 and the operating face (touch face) of the touch panel 70a is relatively great. Accordingly, when operating the touch panel 70a, the possibility of the thumb unintentionally touching the adjacent touch bar 82 is low.

In the present example, the step in the Z direction between the touch face of the touch bar 82 and the touch face of the touch panel 70a is greater than the step in the Z direction between the touch face 401 of the touch bar 82 and the contact face for turning the sub-electronic dial 73.

A line segment A is defined extending in the direction of slide operations, and passing through midpoints of the short sides of the touch detecting face of the touch sensor electrode 302 as the detecting unit (FIGS. 3A and 3B). In this case, a region of the N'th touch detecting face 302*n* that is closer to the sub-electronic dial 73 with the line segment A (center line) as a reference is a first region. With the region of the N'th touch detecting face 302*n* on the side closer to the display unit (touch panel) 28 as a second region, the surface area of the first region is narrower than the surface area of the second region.

FIG. 3B is a diagram illustrating the shape of the touch operation detecting unit according to the present example. The touch sensor electrode 302 that detects touch operations is provided within the touch bar 82, as illustrated in FIG. 3B.

The touch sensor electrode (touch detecting face) 302 is laid out divided into the three of 302*a*, 302*b*, and 302*c* from the eyepiece 16 side in the present example. Although the touch sensor electrode (touch detecting face) 302 is divided into three in the present example, this is not restricted to being divided into three, and may be divided into two, four, or more.

The touch sensor electrodes are formed of copper foil or the like on the flexible board 301, and connected to the system control unit 50 by copper foil wiring (omitted from illustration) on the flexible board 301. The system control unit 50 calculates positional coordinates based on output information from the touch bar 82, i.e., information input from the first through third touch sensor electrodes 302*a*, 302*b*, and 302*c*, as described above. What sort of operations have been performed at the touch bar 82 is determined from operations and states.

The first touch sensor electrode 302*a* has a surface area that is relatively wider than that of the touch sensor electrode 302*c*, and input is performed more readily, as illustrated in FIG. 3B. In the present example, the area of the first touch sensor electrode 302*a* is approximately 36 mm$^2$, the area of the second touch sensor electrode 302*b* is approximately 34 mm$^2$, and the area of the third touch sensor electrode 302*c* is approximately 26 mm$^2$. The touch sensor electrode 302*a* is set to have a surface area of 1.3 to 1.4 times that of the touch sensor electrode 302*c*, and the relation in size among the touch sensor electrodes is set to be 302*a*>302*b*>302*c*.

The surface area of the second touch detecting face 302*b* is smaller than the surface area of the first touch detecting face 302*a*, and the surface area of the second touch detecting face 302*b* is wider than the surface area of the third touch detecting face 302*c*.

Thus, the first touch sensor electrode 302*a* can be adjusted to provide a desired or predetermined ease of input, by cancelling out the distance from the thumb standby position 300 and difficulty of input due to being adjacent to the eyepiece 16. This adjustment enables calculation of coordinates and determination of operations to be performed accurately as to the intent of operations by the user.

The third touch sensor electrode 302*c* has a shape where close to the sub-electronic dial 73 has been cut off, as illustrated in FIG. 3B. More specifically, the third touch sensor electrode 302*c* has been cut such that a grade is formed where the cut region increases the closer to the sub-electronic dial 73 in the X-axis direction. Accordingly, unintended input occurs less readily at the third touch sensor electrode 302*c* even in a case where the user operates the sub-electronic dial 73 with momentum.

Further, the positioning hole 303 is provided to the flexible board 301 in free space created by narrowing the third touch sensor electrode 302*c*, as illustrated in FIG. 3B.

Figure 4B:
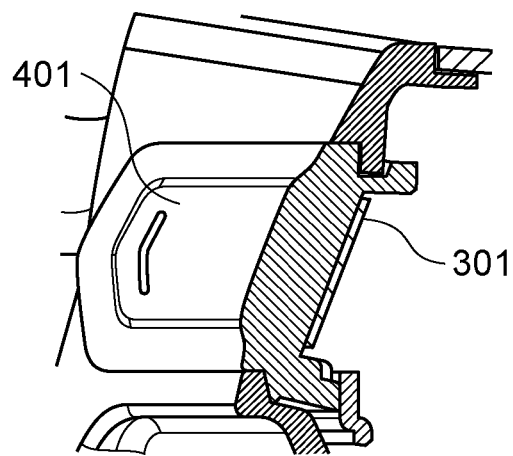
Figure 4C:
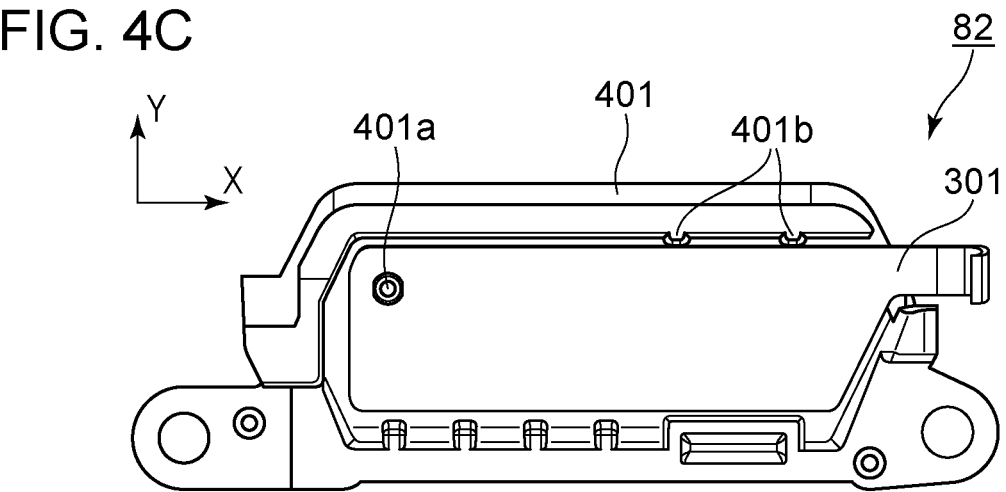

FIGS. 4A through 4C are diagrams for describing a method of attaching the flexible board 301 to the touch bar 82. FIG. 4A is a plane view of the digital camera 100 from above, and FIG. 4B is a sectional view taken along line IVB-IVB in FIG. 4A. FIG. 4C is a plan view illustrating the attachment state of the flexible board 301 as to the touch bar 82 as seen from the inner side of the digital camera 100.

Reference numeral 401 denotes a keytop of the touch bar 82 that serves as an operating face (touch face), formed of a non-electroconductive resin material, with a boss 401*a* and rib 401*b* formed on the inner side of the digital camera 100.

The flexible board 301 is applied to the keytop 401 of the touch bar 82 by double-sided adhesive tape that is omitted from illustration, by the boss 401*a* being fit to the positioning hole 303 and the flexible board 301 being pressed against the ribs 401*b*. The double-sided adhesive tape is preferably thin, around 50 μm to 100 μm, to prevent interfering with detection by the touch sensor. Accordingly, the flexible board 301 and touch sensor electrodes wired thereto can be attached to the keytop 401, in a restricted region with high precision near the touch sensor electrodes.

Figure 5A:
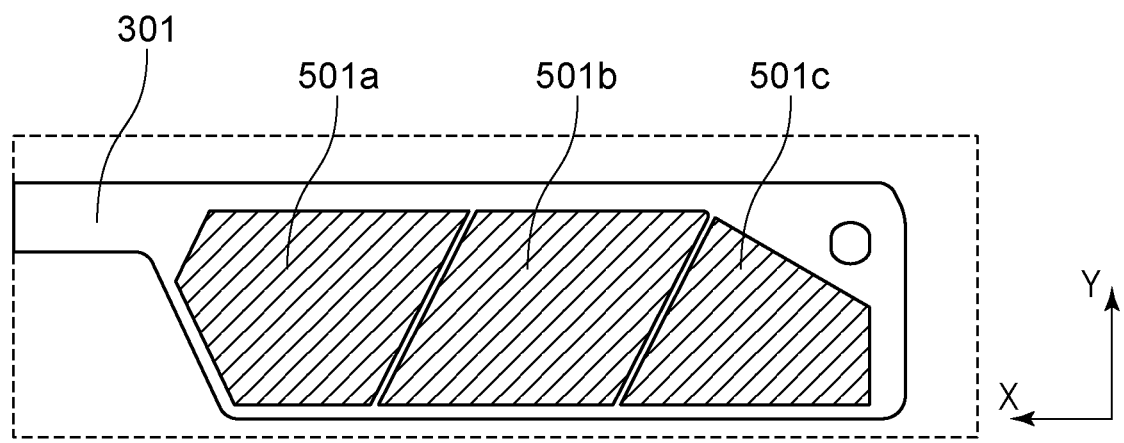
FIGS. 5A and 5B are diagrams illustrating an example of a shape of a touch sensor electrode.
Figure 5B:
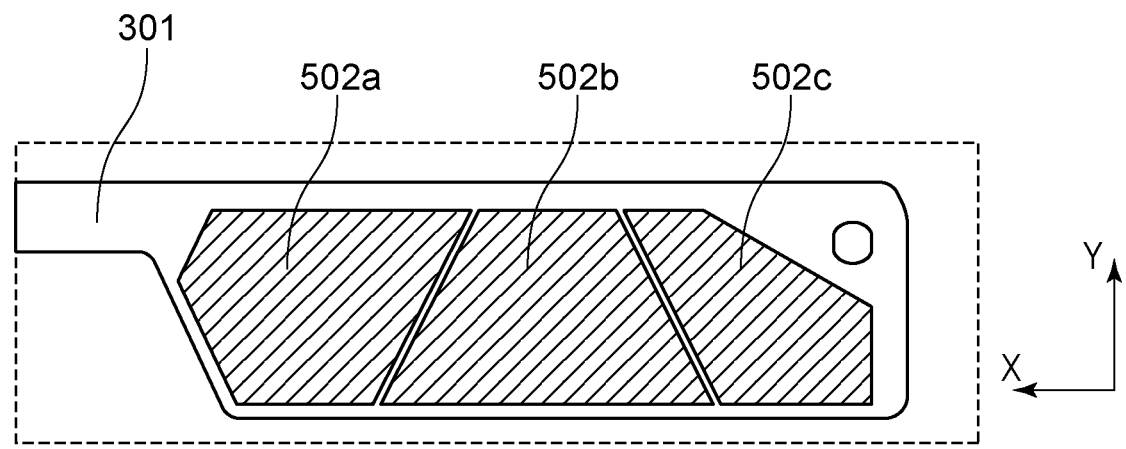

Next, features of the touch sensor electrode shapes according to the present example will be described with reference to FIGS. 3A through 5B. FIGS. 5A and 5B are examples of the shapes of the touch sensor electrode 501*b* where performance is lower than the touch sensor electrode 302 according to the present example that is illustrated in FIG. 3B.

In the touch sensor electrode 302 according to the present example illustrated in FIG. 3B, dogleg gradient shapes are formed from the touch sensor electrode 302*b* toward the adjacent touch sensor electrodes 302*a* and 302*c*. According to this arrangement, input values of capacitance of touch sensor electrodes gradually transitions to the adjacent electrode when performing slide operations, and linearity can be secured in operations.

The touch sensor electrode 501*b* illustrated in FIG. 5A also has a gradient shape as to the adjacent touch sensor electrodes 501*a* and 501*c*, but there is an issue in that the positional coordinate values may be determined differently between a case of performing an operation in contact with the upper portion in the Y direction and performing an operation in contact with the lower side in the Y direction in FIG. 5A. Specifically, in a case where operations are performed in contact with the upper side in the Y direction, the positional coordinates tend to be determined to be toward the left side in the X direction, and in a case where operations are performed in contact with the lower side in the Y direction, the positional coordinates tend to be determined to be toward the right side in the X direction.

In the same way, the touch sensor electrode 502*b* illustrated in FIG. 5B has a gradient shape as to the adjacent touch sensor electrodes 502*a* and 502*c*, but there is an issue in that linearity is poor in a case of performing a side operation in contact with the upper side in the Y direction and performing a slide operation in contact with the lower side in the Y direction in FIG. 5B. Specifically, in a case where a slide operation is performed in contact with the upper side in the Y direction, change in positional coordinates is sudden around the middle in the X direction. On the other hand, in a case where a slide operation is performed in contact with the lower side in the Y direction, change in positional coordinates is sluggish around the middle in the X direction.

As described above, the dogleg gradient shape in the touch sensor electrode 302 is to secure linearity for when performing slide operations. However, if the gradient angle is too acute, linearity can be secured, but there is a higher possibility that determination of contact position may be erroneous. On the other hand, if the gradient angle is too obtuse, linearity cannot be secured.

Accordingly, with the touch sensor electrode 302 according to the present example illustrated in FIG. 3B, the apices of the dogleg gradient shape are situated around the general middle portion of the touch sensor electrode 302 in the Y direction, and the angles θ1 and θ2 of the apices are set to generally 90 degrees.

The second touch detecting face 302b situated between the first touch detecting face 302a and the third touch detecting face 302c has tapered shapes protruding toward the adjacent touch detecting faces in the direction of slide operations. When viewed from the rear side of the electronic equipment, the touch sensor electrode 302 is rectangular, and the tapered shape has apices at the general middle in the short side direction of the touch detecting face 302.

When viewing from the rear side of the electronic equipment, preferably, the detecting face of the touch sensor electrode 302 is rectangular, the tapered shape is linear, and a tapering angle θ of the protruding portion of the detecting face of the touch sensor electrode 302 satisfies $80°≤θ≤100°$. However, it should be noted that these are preferable setting values in a case where the electrode is rectangular long in the X direction as in the present embodiment, and in a case where the shape of the electrode is close to a square, the angle of the apices should be obtuse. Thus, FIGS. 5B and 5A are also included in the present embodiment, but the arrangement in FIG. 3B is better than that in FIGS. 5B and 5A from the perspective of securing linearity.

Figure 6A:
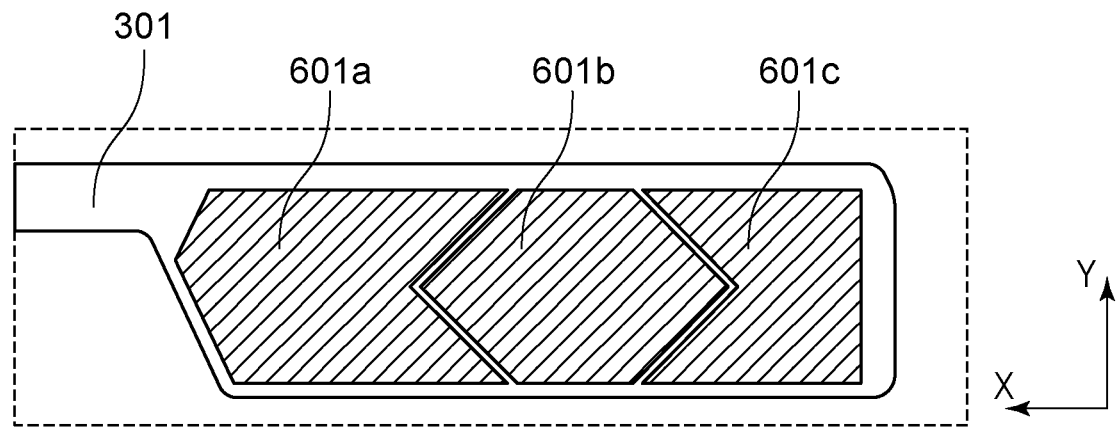
FIGS. 6A through 6C are diagrams illustrating a modification of a touch sensor electrode.
Figure 6B:
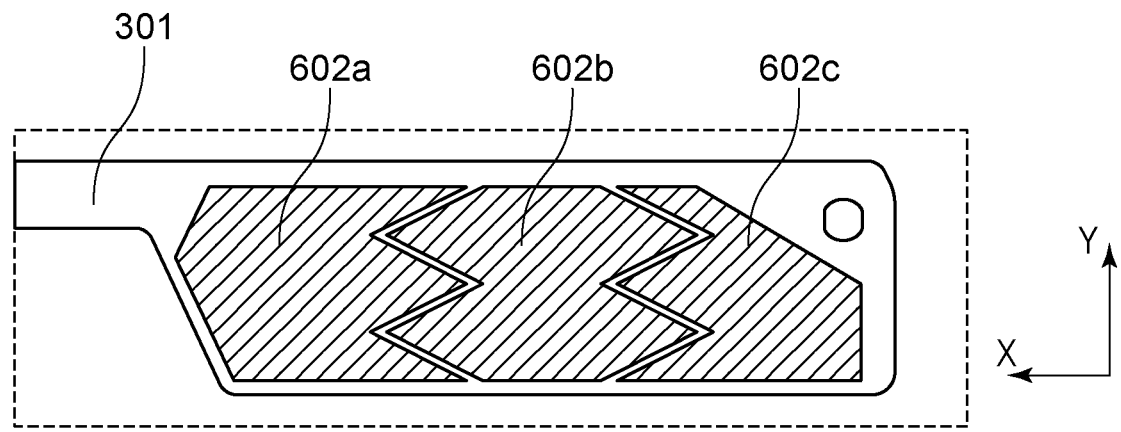
Figure 6C:
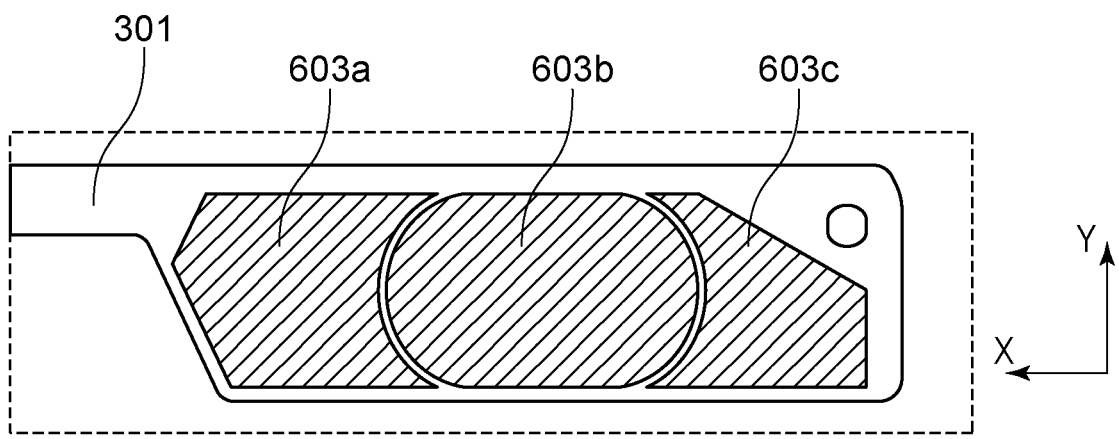

FIGS. 6A through 6C are modifications of the touch sensor electrodes. FIG. 6A is a variation of the electrode shape in a case where the sub-electronic dial 73 is not disposed in the proximity of the touch bar 82. Although there is no portion of a touch sensor electrode 601c that is cut, but a touch sensor electrode 601a has a relatively large surface area set as compared to the touch sensor electrode 601c, and input is facilitated.

FIGS. 6B and 6C are variations of gradient shapes. In a case where the gradient shape is changed, the apex angle or tapering angle needs to be set in accordance with the shape thereof, to obtain good linearity.

Although an embodiment of the present disclosure has been described, the present embodiment is not restricted to this embodiment, and various modifications and alterations may be made within the scope of the essence thereof.

Also, although description has been made where the size of a touch sensor electrode is the planar surface area, for example, ease of input may be adjusted by three-dimensional shapes, such as curved shapes, uneven shapes, and so forth.

This is also applicable to operating members disposed on the left-hand side of the eyepiece 16, and operating members disposed longwise in the vertical direction (Y-axis direction) as well.

The electronic equipment according to the present disclosure is not restricted to a digital camera that is an imaging apparatus, and may be applied to photocopiers, laser beam printers (LBP), and ink jet printers as well. The touch bar according to the present disclosure may be used for a touch operating face where numbers of copies, size of copy paper sheets, and so forth, are changed by touch operations/slide operations, while holding a monitor.

The present disclosure is also applicable to mobile devices such as smartphones, tablet computers, smart watches, and other like portable small-sized computers. The touch bar according to the present disclosure may be disposed outside of the screen of the mobile device and can be used for touch operations/slide operations for image feeding, selecting, and so forth.

Further, the present disclosure is also applicable to automotive, medical equipment, and gaming usages. The touch bar according to the present disclosure may be disposed on the steering wheel of an automobile, so as to enable menu switching by touch operations, or fine adjustment of audio level, zooming in/out an automotive navigation screen, and so forth by slide operations, while steering the automobile. In medical equipment usages, the touch bar according to the present embodiment may be disposed on a grip of a handy X-ray device, to enable fine adjustment by slide operations.

According to the present disclosure, electronic equipment can be provided that has a touch sensor operating member where erroneous operation can be reduced even in a case where there has been change in ease of input due to positional relation with other members of the electronic equipment.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-125509, filed Jun. 29, 2018, which is hereby incorporated by reference herein in its entirety.

What is claimed is:

1. Electronic equipment comprising:
a first operating member having a detecting unit configured to detect touch operations and slide operations;
a second operating member disposed adjacent to an operating face of the first operating member in a direction of the slide operations; and
a protruding portion disposed adjacent to the operating face of the first operating member in the direction of the slide operations, and protruding in a direction orthogonal to the direction of the slide operations as to the operating face of the first operating member,
wherein a detecting face of the detecting unit is divided into at least two detecting faces of a first detecting face through an N'th detecting face, in order from a side of the protruding portion in the direction of the slide operations,
wherein the second operating member is closest to the N'th detecting face of the at least two detecting faces in the direction of the slide operations, and
wherein, in a case of defining a line segment extending in the direction of the slide operations, and passing through midpoints of short sides of the detecting face of the detecting unit, where a region of the N'th detecting face that is on a side closer to the second operating member with the line segment as a reference is a first region, and a region of the N'th detecting face that is on a side farther from the second operating member is a second region, an area of the first region is narrower than an area of the second region.

2. The electronic equipment according to claim 1, wherein the second operating member is a rotational operating member configured for a user to operate by moving a finger in the direction of the slide operations.

3. The electronic equipment according to claim 1, wherein, in the case of defining the line segment extending in the direction of the slide operations, and passing through the midpoints of the short sides of the detecting face of the detecting unit, the N'th detecting face has a shape where a side on the second operating member is narrower than a side opposite from the second operating member, with the line segment as a reference.

4. The electronic equipment according to claim 3, wherein a positioning hole is provided to a printed circuit board to which the detecting unit is mounted, at a region generated by narrowing the N'th detecting face.

5. Electronic equipment comprising:
a first operating member having a detecting unit configured to detect touch operations and slide operations; and
a protruding portion disposed adjacent to an operating face of the first operating member in a direction of the slide operations, and protruding in a direction orthogonal to the direction of the slide operations as to the operating face of the first operating member,
wherein a detecting face of the detecting unit is divided into at least two detecting faces of a first detecting face through an N'th detecting face, in order from a side of the protruding portion in the direction of the slide operations,
wherein an area of the first detecting face is wider than an area of the N'th detecting face,
wherein the detecting face of the detecting unit is divided into at least three detecting faces, and
wherein a situated detecting face situated between the first detecting face and the N'th detecting face in the direction of the slide operations has a tapered shape protruding to an adjacent detecting face in the direction of the slide operations.

6. The electronic equipment according to claim 5,
wherein the detecting face of the detecting unit is rectangular, and
wherein the tapered shape has an apex at general middle in a short side direction of the detecting unit.

7. The electronic equipment according to claim 5, wherein the detecting face of the detecting unit is rectangular, the tapered shape is linear, and a tapering angle θ of the tapered shape satisfies 80°≤θ≤100°.

8. Electronic equipment comprising:
a first operating member having a detecting unit configured to detect touch operations and slide operations; and
a protruding portion disposed adjacent to an operating face of the first operating member in a direction of the slide operations, and protruding in a direction orthogonal to the direction of the slide operations as to the operating face of the first operating member,
wherein a detecting face of the detecting unit is divided into at least two detecting faces of a first detecting face through an N'th detecting face, in order from a side of the protruding portion in the direction of the slide operations,
wherein an area of the first detecting face is wider than an area of the N'th detecting face,
wherein the detecting face of the detecting unit is divided into three detecting faces, which are the first detecting face, a second detecting face, and a third detecting face, in order from the side of the protruding portion, in the direction of the slide operations, and
wherein an area of the second detecting face is smaller than the area of the first detecting face, and the area of the second detecting face is wider than an area of the third detecting face.

9. Electronic equipment comprising:
a first operating member having a detecting unit configured to detect touch operations and slide operations;
a second operating member disposed adjacent to the operating face of the first operating member in the direction of the slide operations; and
a protruding portion disposed adjacent to an operating face of the first operating member in a direction of the slide operations, and protruding in a direction orthogonal to the direction of the slide operations as to the operating face of the first operating member,
wherein a detecting face of the detecting unit is divided into at least two detecting faces of a first detecting face through an N'th detecting face, in order from a side of the protruding portion in the direction of the slide operations,
wherein an area of the first detecting face is wider than an area of the N'th detecting face, and
wherein, in a case of defining a line segment extending in the direction of the slide operations, and passing through midpoints of short sides of the detecting face of the detecting unit, where a region of the N'th detecting face that is on a side closer to the second operating member with the line segment as a reference is a first region, and a region of the N'th detecting face that is on a side farther from the second operating member is a second region, an area of the first region is narrower than an area of the second region.

10. Electronic equipment comprising:
a first operating member having a detecting unit configured to detect touch operations and slide operations;
a protruding portion disposed adjacent to a first operating face of the first operating member in a direction of the slide operations, and protruding in a direction orthogonal to the direction of the slide operations as to the first operating face of the first operating member, and
a display unit configured to display images recorded in a recording medium, and having a second operating face capable of receiving the touch operations, the slide operations, and tap operations,
wherein a detecting face of the detecting unit is divided into at least two detecting faces of a first detecting face through an N'th detecting face, in order from a side of the protruding portion in the direction of the slide operations,
wherein an area of the first detecting face is wider than an area of the N'th detecting face,
wherein the operating face of the first operating member is a first operating face,
wherein the first operating member and the display unit are arrayed in the direction orthogonal to the direction of the slide operations, and
wherein, when viewing the electronic equipment from a rear side, the first operating member is situated at a position recessed to a front side as to the second operating face.

11. The electronic equipment according to claim 10, further comprising a second operating member disposed adjacent to the first operating face,
wherein, in a case of defining a line segment extending in the direction of the slide operations, and passing through midpoints of short sides of the detecting face of the detecting unit, where a region of the N'th detecting face that is on a side closer to the second operating member with the line segment as a reference is a first region, and a region of the N'th detecting face on a side closer to the display unit is a second region, an area of the first region is narrower than an area of the second region.

* * * * *